Sept. 27, 1949.  F. W. MERRILL  2,483,146
DYNAMOELECTRIC MACHINE
Filed Nov. 14, 1947  2 Sheets-Sheet 1

Inventor:
Frank W. Merrill,
by Prowell S. Mack
His Attorney.

Patented Sept. 27, 1949

2,483,146

UNITED STATES PATENT OFFICE 2,483,146

DYNAMOELECTRIC MACHINE

Frank W. Merrill, Fort Wayne, Ind., assignor to General Electric Company, a corporation of New York Application November 14, 1947, Serial No. 785,848

15 Claims. (Cl. 322—92)

This invention relates to commutating type dynamoelectric machines of the type in which the armature reaction provides a major source of excitation.

A dynamoelectric machine of the armature reaction excited variety normally comprises a rotor or armature having a winding and a commutator of the type used on conventional direct-current machines. The major component of excitation in this type of machine is provided by the armature reaction flux produced by current flowing in the armature winding. To facilitate the production of this armature reaction, a plurality of mutually displaced brush sets are provided, at least one set being connected to a low resistance circuit amounting essentially to a short-circuit. Another set of brushes is connected to a load circuit when the machine is used as a generator or to a power supply circuit when the machine is used as a motor.

The stationary member of such a machine is arranged to provide paths of low reluctance for the various magnetic fluxes set up by the armature currents, and is provided with various windings to improve or control the operation of the machine. These stator windings include an exciting or control winding for inducing the voltage in the quadrature rotor circuit for producing the heavy flow of current in the low resistance path provided, which in turn produces the desired main field, heavy armature reaction flux. In the most effective constructions, a compensating winding is provided to neutralize substantially the armature reaction attributable to the current flowing to the load when the machine is used as a generator, or from the power source when the machine is used as a motor. With such an arrangement, this type of dynamoelectric machine, used as a direct current excited generator, can be made by appropriate design of the various circuits to provide a variable voltage or variable current output with rapid response to adjustment of the control field excitation and a very high amplification ratio between the change in output and the change in input to the control field. When this type of machine is used as a direct current driven motor, the control field gives exceptionally accurate control of speed with low energy input and the machine is thus adaptable for use with simple low energy speed regulation systems.

A dynamoelectric machine of the type described above is generally referred to as an "amplidyne," the term referring to an armature reaction excited dynamoelectric machine having a control field winding, a low resistance quadrature circuit brush path, and a compensating winding for neutralizing the secondary armature reaction.

Application Serial No. 785,846, filed November 14, 1947, of William A. Pringle and assigned to the assignee of the present application, discloses means for operating an amplidyne motor from a source of alternating current; or for causing an amplidyne generator to generate alternating current, when excited by alternating current, by providing appropriately selected means for tuning the inductive windings of the machine. By tuning the control and quadrature circuits of a machine, otherwise primarily usable as a direct current excited amplidyne type generator with direct current output, it is possible to operate the machine as an alternating current generator from an alternating current excitation source. When thus excited, the frequency of the output voltage depends solely upon the frequency of the exciting power agency, which may be a very low energy source such as a vacuum tube oscillator, tuning fork, etc., and is independent of the number of poles and speed of the machine. Accordingly, low energy alternating current can be greatly amplified without change of the original frequency and the alternating current output can be regulated or controlled by suitable low energy means acting on one or more of the control fields.

Another important result of the application of the tuning principle to amplidyne type machines is the provision of an alternating current motor which can be run at an off-synchronous speed, the speed of the machine being independent of the number of poles and frequency of the power source and dependent only on the voltage applied, the amount of quadrature (main field) flux, load, windings, and temperature. Moreover, because of the high amplification inherent in an amplidyne motor, a very low energy speed regulating device can be used.

An object of this invention is to provide an improved alternating current dynamoelectric machine of the amplidyne type.

Another object of this invention is to provide an improved alternating current dynamoelectric machine of the amplidyne type in which the transformer voltage between the quadrature circuit and the armature windings short-circuited by the direct axis brushes is substantially neutralized.

A further object of this invention is to provide an improved variable speed alternating current motor.

A still further object of this invention is to provide an improved alternating current generator wherein the frequency generated is independent of the speed of the machine.

Further objects and advantages of this invention will become apparent and this invention will be better understood from the following description referring to the accompanying drawings, and the features of novelty which characterize this invention will be pointed out with particularity in the claims annexed to and forming a part of this specification.

A feature of this invention is the provision of appropriate interpoles for substantially neutralizing the transformer voltage generated by the quadrature flux of an alternating current amplidyne type machine in the armature coils short-circuited by the direct axis brushes while undergoing commutation. It will be apparent that an alternating current amplidyne, whether arranged as a motor or generator, will inherently have this transformer voltage generated whenever there is an alternating current flowing in the quadrature circuit, since the alternating flux produced by the alternating current flowing in the quadrature circuit loops the armature coils short-circuited by the direct axis brushes thus inducing a voltage in these coils by transformer action. Unless this voltage is neutralized, serious sparking is produced on the direct axis brushes when the machine is in operation.

In the drawing, Fig. 1 illustrates schematically one connection of the interpole winding of this invention applied to an alternating current amplidyne generator, in Fig. 2 there is shown a cross-sectional view of an alternating current amplidyne stator showing the physical arrangement of the interpole windings. Fig. 3 illustrates another method of connecting the interpole winding of this invention in an alternating current amplidyne generator.

Figures 1, 2, 3:
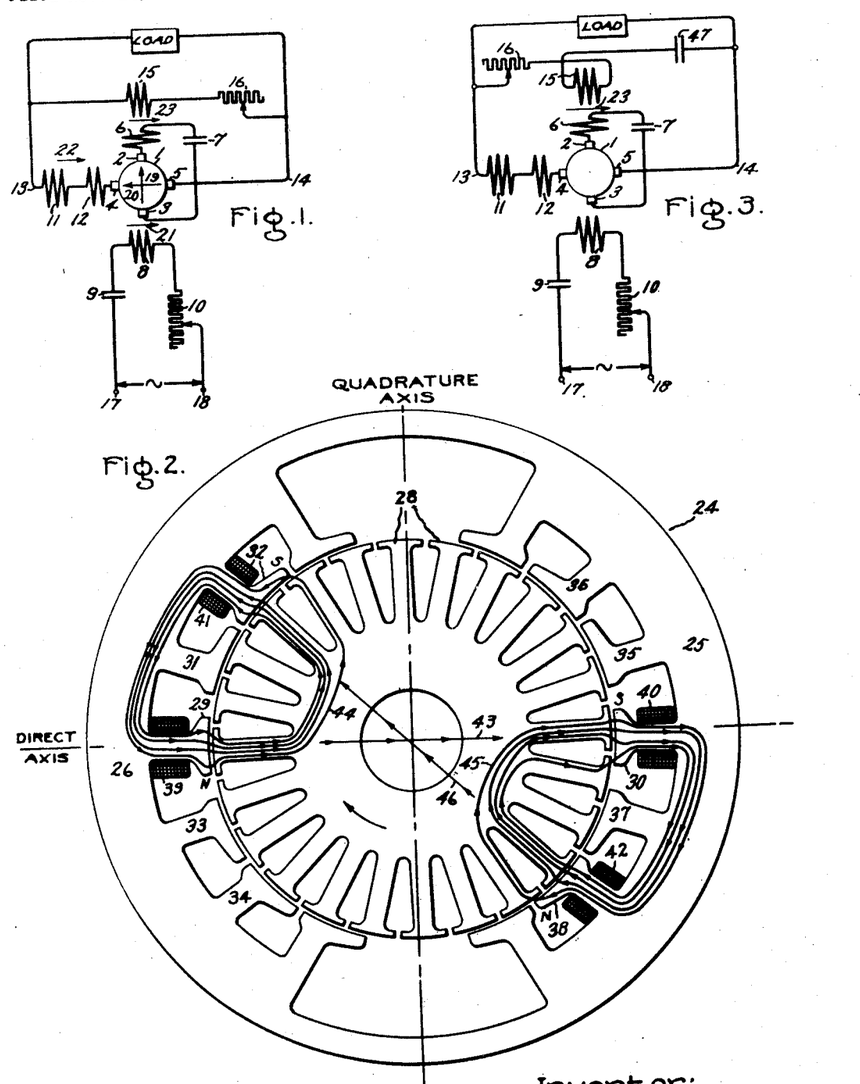

Referring now to Fig. 1, there is shown an embodiment of this invention applied to an alternating current amplidyne generator having a rotatable armature 1 provided with a commutator connected to an armature winding of the conventional direct current type and adapted to be driven by any suitable source of mechanical power (not shown). In this schematic presentation, the stationary member with its associated pole pieces is also not shown.

The armature 1 is provided with a set of primary or quadrature brushes 2 and 3 a set of secondary or direct-axis brushes 4 and 5 displaced about the commutator from the primary brush set by 90 electrical degrees. The quadrature and direct axis brush sets provide quadrature and direct axis or load circuits respectively through the armature 1.

The quadrature circuit includes a quadrature series field 6, and a tuning capacitor 7 in series with the quadrature brushes 2 and 3. The direct axis brushes 4 and 5 are connected to a load at terminals 13 and 14 and compensating field 11 in series with the direct axis brushes serves to neutralize substantially the secondary armature reaction produced by current flowing in the direct axis circuit. Field winding 12 is a conventional load interpole winding which corrects the commutation of the direct axis brushes for variations of load current in the same manner as the interpoles of a direct current amplidyne generator. This winding may be wound around the center tooth of the stator in line with the direct axis, or in larger machines, a separate interpole may be provided. This interpole, however, is not the interpole which is the subject of this disclosure since it does not in any sense neutralize the transformer voltage between the quadrature and direct axis circuit.

The control field exciting winding 8 is arranged to be energized from a suitable low energy master frequency source, such as a signal generator or tuning fork at terminals 17 and 18; and the control field circuit also includes tuning capacitor 9 and variable resistor 10 as shown. The function of these two elements will be more fully explained hereinafter.

Since the quadrature circuit through the stator winding 6, tuning capacitor 7, and quadrature brushes 2 and 3 is of inherently low impedance, a very small amount of excitation flux will generate sufficient voltage across the quadrature brushes 2 and 3 to produce a relatively large primary or quadrature current flow through that part of the armature winding which is connected between these brushes. This quadrature armature current produces a magnetic flux or primary (quadrature) armature reaction along the quadrature axis as indicated by the arrow 19 (all arrows used herein designate an instantaneous condition for a particular polarity or half cycle of the exciting source). As the armature 1 rotates, the conductors which are connected to the secondary or direct axis brushes 4 and 5 will cut the quadrature armature reaction flux and a voltage will be induced between these brushes. Since these brushes are connected to the load at terminals 13 and 14, a secondary or direct axis current will flow through the direct axis circuit of the armature 1 producing a secondary or direct axis armature reaction along the axis of the direct axis brushes, as shown by the arrow 20.

In order to control the secondary voltage and load characteristics of the generator, the field exciting winding 8 is arranged to provide a feeble magnetic excitation along the direct axis of the machine, as shown by the arrow 21. This excitation induces a small electromotive force in the armature winding between the quadrature brushes 2 and 3 and in turn produces a relatively high quadrature current between these brushes by virtue of the low impedance of the circuit through the quadrature field winding 6 and tuning capacitor 7. Variable resistor 10 is used to vary the current through the control field winding 8, so as to adjust the excitation produced thereby.

It will now be apparent that the control of the quadrature flux, and hence the control of the secondary voltage, by the small amount of energy supplied to the control field 8, would not be possible unless the direct axis armature reaction 20 is neutralized. It will be noted that the excitation provided by the control field and the secondary armature reaction fall along the same axis; in the case of a generator as shown here, they are opposed, however, in a motor, they are additive. Since the secondary armature reaction flux is of a much greater magnitude than the flux provided by the control field, the secondary armature reaction will tend to override and destroy the effect of the control field excitation unless it is completely neutralized. This result is provided by compensating field 11 which supplies an opposed mmf, shown here by the arrow 22, which substantially neutralizes the secondary armature reaction thus cancelling the magnetic back coupling effect of the electric current in the direct axis circuit of the armature.

With the direct axis compensating system described above, the control field 8 is only required to supply a relatively small excitation, and may therefore be designed for very low current input, increasing its ratio of resistance to inductance and thereby its speed of response and sensitivity to control. Therefore, a compensated amplidyne type generator can be made to have a high amplification factor because of the relatively small amount of power required to excite the control field winding.

The quadrature tuning capacitor 7 and the control field tuning capacitor 9 are provided in accordance with the invention of the aforementioned application Serial No. 785,846 in order to enable an amplidyne type dynamoelectric machine, otherwise primarily usable as a direct current device, to be operated on alternating current. It is well known that a series direct current motor will continue to run in the same direction if the polarity of the voltage applied is reversed, this result being due to the simultaneous reversal of the field flux and the armature current. It has, however, been generally considered impractical to operate shunt excited machines, and by analogy armature reaction excited machines, from alternating current, because inductance effects make it apparently impossible to synchronize to the necessary degree the alternations of the armature current and the excitation flux. The aforementioned application discloses that in the case of armature reaction excited machines, this difficulty can be overcome by appropriately tuning certain of the critical circuits.

The above referred to application Serial No. 785,846 discloses that in an amplidyne type machine operated from 5 to 20 cycles, it is only necessary to tune the control field circuit, but that from 20 to 200 cycles, both the control field and quadrature circuits must be tuned, as illustrated in Fig. 1 of this application. It was found that in a certain fractional horsepower frame size machine, a capacitor of .4 mf. was sufficient to adequately tune the control field circuit, while a capacitor of 450 mf. was required to tune the quadrature circuit. It was also found that for frequencies over 200 cycles, all circuits, i. e., quadrature, direct axis, and control field, had to be tuned. With this tuning, an amplidyne type machine arranged as a generator will generate alternating current of a frequency independent of the speed or number of poles of the machine, the frequency being determined entirely by the frequency applied to the control field, and, due to the inherent amplification characteristics of this type of machine, the excitation required to be applied to the control field can be of relatively low power such as can be supplied from a signal generator, i. e.; on the order of 2 to 4 watts.

When an amplidyne motor has its circuits tuned, a variable speed motor is provided wherein the speed does not depend on the frequency and the number of poles, but depends on the excitation applied (quadrature flux), the line voltage, the load, the windings, and the temperature. Moreover, because of the high amplification factor of an amplidyne motor, a very low energy speed regulating device can be employed in connection with the control field.

As thus far described, the machine of Fig. 1 is essentially as shown in Fig. 3 of the aforesaid application Serial No. 785,846. As indicated above, when an alternating current excitation is applied to control field 8, an alternating voltage is induced across the armature windings between the quadrature brushes 2 and 3, and by virtue of the low reactance connection across these brushes through the quadrature field 6 and tuning capacitor 7, an alternating current will flow through the armature windings between the quadrature brushes. This alternating quadrature armature current produces the alternating quadrature armature reaction flux on which the fundamental principle of operation of the armature reaction excited dynamoelectric machine is based. It will be apparent that this alternating quadrature armature reaction flux will be present, except when the machine is at a standstill, whenever alternating current is applied to the control field of the generator, whether or not a load is being drawn from the machine. In addition to being cut by the armature windings between the direct axis brushes 4 and 5 to generate the direct axis voltage, this flux loops those armature coils which are short-circuited by the direct axis brushes while undergoing commutation and thereby induces a transformer voltage therein. This transformer voltage is undesirable since it produces serious sparking on the direct axis brushes.

In order to neutralize substantially the transformer voltage which produces this sparking, the arrangement now to be described is provided. It will be apparent that if an interpole flux is introduced which is 90° out of phase with the alternating current quadrature armature reaction flux and of the proper polarity, the armature windings short-circuited by the direct axis brushes cutting this interpole flux at sufficient speed will generate a voltage due to speed which can be made to neutralize substantially the transformer voltage. To eliminate the effect of this transformer voltage, three factors must be considered: The interpole flux must be 90° out of phase with the quadrature armature reaction flux; it must be of sufficient density and in such a direction that when cut by the short-circuited armature windings at operating speed it will generate a voltage equal and opposite to the transformer voltage; and the speed must be sufficient to require no more interpole flux density than is practicable in the machine in question.

In "The Theory and Calculation of Electrical Apparatus," by C. P. Steinmetz, page 358, it is shown that at synchronous speed, the interpole flux density must be the same as the flux density under the main poles. At higher speeds, it may be less, but at lower speeds, it must be more and as the speed is reduced, the limit of possible density is reached just a little way below synchronism.

To provide the required interpole flux to neutralize the transformer voltage, interpole winding 15 is provided, which produces a component of excitation, shown by the arrow 23, which lags the quadrature armature reaction 19 by 90°. This interpole winding is connected across the output terminals 13 and 14 and variable resistor 16 is provided to shift the power factor and to adjust the strength of the interpole in order to totally eliminate sparking on the direct axis brushes 4 and 5 and thus produce black commutation.

Referring now to Fig. 2, there is shown a cross-sectional view of the armature and stator punchings of an amplidyne type machine illustrating the application of the interpole windings to the stator for the purposes outlined above. Here, the stationary stator member 24 is provided with two polar groups generally identified as 25 and 26. These two groups are provided with polar projections or teeth extending radially inward toward the rotatable armature 27 and armature teeth 28. The stator teeth 29 and 30, which are located on the direct axis, have a smaller gap area than the teeth 31 to 34 and 35 to 38 located on either side of the direct axis teeth.

The interpole winding, corresponding in function to the coil 15 of Fig. 1, is divided into coils 39 and 40 wound on direct axis teeth 29 and 30 and coils 41 and 42 wound on teeth 32 and 38 respectively. For purposes of this discussion, coils 39 and 40 are to be considered as being in series in one group and coils 41 and 42 in series in another group, all four coils being connected in series as the equivalent of the schematic coil 15 of Fig. 1.

Consider now the case where the transformer voltage corrective flux is sent directly across the armature 27 by energizing only coils 39 and 40 which are on the direct axis of the machine in a plane with the direct axis brushes, the coils being connected so that tooth 29 is instantaneously polarized north and tooth 30 polarized south. With this arrangement, flux will be developed across the armature 27 along the line 43, and since this flux is in the same plane as the flux produced by the control field 8 of Fig. 1, the traversing flux 43 will tend to act as a control exciting flux. Since this interpole flux is of much greater density than the usual interpole flux and also of much greater total magnitude than the control field flux, it will cause the quadrature armature reaction flux to lag and tend to become the same phase as the interpole flux thus defeating the ability of the interpole flux to neutralize the transformer voltage and seriously affecting the amplidyne characteristics of the machine.

In order to prevent the condition described above, means are provided to turn back the interpole flux produced by the coils 39 and 40 without allowing it to traverse the armature 27. To effect this turning back, additional interpole coils 41 and 42 are provided wound on teeth 32 and 38 respectively and spaced apart from the coils 39 and 40 by intermediate teeth 31 and 37. Here, coils 41 and 42 are of instantaneous opposite polarity from their associated coils 39 and 40 respectively, thus causing teeth 32 and 38 to be instantaneously polarized south and north respectively. With this arrangement, the flux produced by the coils 39 and 40 is turned back into the teeth 32 and 38 respectively and returned to coils 39 and 40 without traversing the armature, as shown by the lines of flux 44 and 45. The flux returning through teeth 32 and 38 when cut by the armature windings generates an adverse voltage in the windings under these teeth, however, this voltage is ineffectual since there are no brushes located at that section of the armature. The flux under teeth 29 and 30, which is in a plane with the direct axis brushes, is in a direction to correct the transformer voltage and will black out the sparking under the direct axis brushes.

Care must be exercised to connect the interpole windings 15 of Fig. 1 so the lagging current through the winding will have such polarity as to generate a speed voltage in the short-circuited armature coils which will oppose the transformer voltage. If the connections are reversed so that the current is the wrong polarity, the interpole flux will shift 180° and the voltage generated by the armature windings cutting the interpole flux will add to the transformer voltage instead of cancelling it thus increasing instead of decreasing the sparking on the direct axis brushes 4 and 5.

Interpole coils 41 and 42 are shown here as wound on teeth 32 and 38 and spaced apart from the coils 39 and 40 wound on teeth 29 and 30 by one tooth, 31 and 37 respectively. These coils may be placed on teeth 31 and 37 directly adjacent teeth 29 and 30, thus reducing the length of flux loop, however, this would place two interpole coil sides in the same slot between the teeth 29 and 31 and 30 and 37, which may not be desirable since the other stator windings (not shown), such as the compensating field winding 11, load interpole 12, and quadrature series winding 6 must also be placed on the stator teeth. The coils 41 and 42 may also be placed on teeth 33 and 35, or teeth 34 and 36 respectively on the side of the coils 39 and 40 against the rotation of the rotation of the armature (shown by the arrow), however, the arrangement shown in Fig. 2 is the preferred connection.

Complete turning back of the interpole flux may not be accomplished by merely winding the four coils 39—40 and 41—42 with an equal number of turns. Connecting the coils as shown in Fig. 2, will cause fluxes 44 and 45 to return through the teeth of the stationary member 24 without traversing the armature 27, however, other fluxes will cross the armature in opposite directions as shown by the lines 43 and 46. If these two fluxes were equal, their algebraic sum would be zero and there would be no effective interpole flux crossing the rotor. In actual practice, however, if the coils are of equal turns, the flux 46 between the off-center interpoles 41 and 42 exceeds the flux 43 between the direct axis interpoles 39 and 40. This is due to the fact that the gap area of teeth 32 and 38 is greater than the gap area of teeth 29 and 30 and thus the lower gap reluctance of the first-mentioned teeth causes flux 46 to exceed flux 43. Measurement has shown that the flux eminating from a tooth is closely proportional to the gap area under the tooth. It follows therefore that the individual coil winding should be made approximately inversely proportional to the gap area under its associated tooth. It is therefore apparent that the fluxes 43 and 46 can be made to cancel by winding coils 41 and 42 with fewer turns than coils 39 and 40. This is true only when the final circuit is such that all four coils are connected in series to form the single schematic coil 15 of Fig. 1. When the coils are in series, the same current flows through all coils, which makes the ampere turns of coils 41 and 42 less than those of coils 39 and 40 thus equalizing the effect of the larger gap areas under teeth 32 and 38. If the interpole coils are not connected in series, other winding ratios will be necessary to effect cancellation of fluxes 43 and 46.

Referring again to Fig. 1, the quadrature field winding 6 in the quadrature axis circuit, in series with the tuning capacitor 7, is utilized to secure a more uniform field pattern and to reduce the actual current in the quadrature circuit. The flux pattern produced by the current flowing in the quadrature armature circuit alone induced by the action of the control field 8, has an essentially triangular shape. The superposition of the pattern produced by the quadrature field 6, which is substantially rectangular, on the triangular field pattern of the basic quadrature armature reaction flux produces a resultant more uniform field pattern. In addition, the additional field turns of the quadrature winding 6 also reduces the current which must be carried by the quadrature brushes 2 and 3 to establish a given quadrature main field flux.

Referring now to Fig. 3, there is shown the application of the reversed flux interpole arrangement described above to a machine identical with that shown in Fig. 1, except with the polarity of the connection of the interpole winding 15 to the output terminals 13 and 14. In the embodiment of Fig. 1, the resistance 16 is small compared to the inductive reactance of the winding 15, which predominates, and the circuit draws a lagging current. In Fig. 3, the winding of interpole 15 is changed and capacitor 47 so chosen as to not only cancel the inductive reactance of coil 15, but also to draw a leading current from the line 13 and 14. This current, when producing the same ampere turns in winding 15 as in Fig. 1, is just as effective in neutralizing the transformer voltage in the short-circuited armature coils, but to maintain the interpole flux in the same direction, as indicated by the arrow 23, it is necessary to reverse the connections of winding 15 to the line 13 and 14 in order to correct for the 180° reversal of the low power factor interpole current from almost 90° lag, as in Fig. 1, to almost 90° lead, as in Fig. 3.

It should also be noted that the circuit of Fig. 1 is operative because the natural lag of the current drawn from lines 13 and 14 by the interpole windings 15 will produce sufficient phase shift of interpole flux, compared to the main field flux, to generate a speed voltage that will neutralize the transformer voltage in the short circuited armature coils. It should also be noted that the direct axis voltage is in phase with the quadrature flux, arrow 19, and with the control flux, arrow 21, due to the tuning of these circuits by capacitors 7 and 9 respectively, as explained in the aforesaid application Serial No. 785,846. In the circuit of Fig. 3, the natural tendency of the interpole winding to draw a lagging current has been forcibly reversed to make the capacitive reactance predominate. This is another method of accomplishing the same result as that shown in Fig. 1.

As explained above, the circuits of Fig. 1 and 3 are satisfactory for a generator since the direct axis voltage is closely proportional to the main field (quadrature) flux which produces it and, therefore, the interpole corrective flux is also proportional to the quadrature flux which generates the undesirable transformer voltage in the rotor coils short circuited by the direct axis brushes. However, these circuits are unsuitable for an amplidyne motor in which a constant line voltage is impressed on the direct axis. In this case, means must be provided to make the interpole flux proportional to and 90° out of phase with the quadrature flux.

Figure 4:
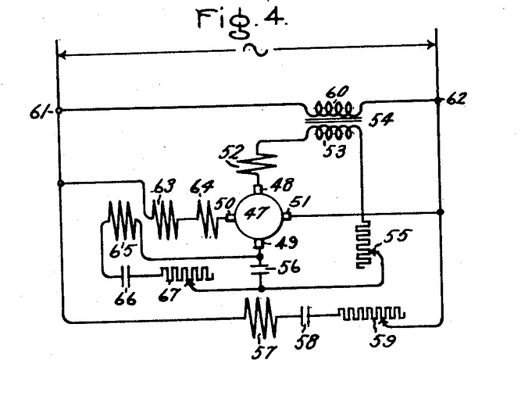
Fig. 4 illustrates the application of the interpole winding of this invention to a shunt start, shunt and amplidyne run alternating current amplidyne motor.

Referring now to Fig. 4, there is shown an alternating current amplidyne motor having the improved interpole arrangement of this invention applied to a machine with shunt start and shunt and amplidyne running characteristics, as described in application Serial No. 785,847 of the present inventor and assigned to the assignee of this application, and illustrated in Fig. 4 thereof. In this embodiment, an indirect excitation feature is provided by utilizing an insulating transformer between the line and the quadrature circuit to enable the superposition of the power voltage on the voltage produced by the control field excitation in the quadrature circuit. Here, the armature 47 is provided with quadrature brushes 48 and 49 and direct axis brushes 50 and 51. The quadrature circuit includes quadrature field winding 52, secondary winding 53 of insulating transformer 54, variable resistor 55 used to control the flow of quadrature current, and tuning capacitor 56. Control field winding 57 is tuned by capacitor 58, and variable resistance 59 which is utilized to control the exciting voltage to the control field. The primary 60 of insulating transformer 54; together with the direct axis circuit including compensating field 63, conventional load interpole winding 64, and direct axis brushes 50 and 51; and the control field circuit are all connected across power supply lines 61 and 62. The reversed flux interpole circuit of this invention includes shunt interpole winding 65, capacitor 66 and variable resistor 67.

In operation, control field 57 provides a component of excitation which produces a generated voltage across the quadrature brushes 48 and 49. Due to the inherently low reactance of the quadrature circuit through the quadrature winding 52, transformer secondary 53, resistor 55, and capacitor 56, relatively low excitation is required of the control field to produce a large flow of quadrature armature current between brushes 48 and 49. This quadrature armature current produces a quadrature armature reaction flux which co-acts with the current flowing from the line 61—62 through the compensating field winding 63, interpole winding 64, and the armature windings between the direct axis brushes 50 and 51, to produce the motor torque.

The voltage across the transformer secondary 53, which is responsive to the line voltage, is impressed on the quadrature circuit in series with the generated voltage across brushes 48 and 49 produced by the action of the control field 57. This connection provides a source of shunt excitation from the line in that the major portion of the quadrature armature current is produced by virtue of the voltage across the transformer secondary and thus the excitation required of control field 57 in order to effect accurate speed control over a narrow range can be very small. The voltage generated across brushes 48 and 49 can be arranged to either buck or boost the voltage of the transformer secondary 53. If the generated voltage boosts the transformer voltage, decreasing the resistance of variable resistor 59 will reduce the motor speed, while a bucking connection results in an increased motor speed when the resistance of variable resistor 59 is decreased.

Since the predominate portion of the armature reaction flux is produced by current flowing in the quadrature circuit by virtue of the voltage across the transformer secondary, the speed of the motor can be approximately adjusted by variable resistor 55 and since exceptionally low exciting energy is required of the control field 57, the speed can be accurately regulated within narrow limits by adjustment of variable resistor 59. Resistor 59 can be substituted by a suitable low energy speed regulating device.

It will now be apparent that the motor of Fig. 4 will start in a manner analogous to a conventional shunt excited machine. Starting at rest, there will be an immediate flow of current through the quadrature circuit due to the connection of transformer secondary 54 in series with the quadrature brushes. This current provides an initial quadrature armature reaction flux which co-acts with the current flowing from the line in the direct axis circuit to produce the starting motor torque. As soon as rotation starts, a voltage is generated in the quadrature circuit responsive to the excitation of the control field at which point the motor assumes its running shunt and amplidyne characteristics.

In this motor circuit, the quadrature field circuit is tuned by capacitor 56 so that its current will be in phase with the control field flux. However, the voltage across the quadrature capacitor 56 lags the quadrature current by 90°. The capacitor 66 being arranged to neutralize substantially the inductance of the shunt interpole winding 65, it is only necessary to connect the interpole circuit across the quadrature capacitor 56 to obtain the 90° lagging interpole flux necessary to neutralize the transformer voltage. This is due to the fact that the characteristic of the interpole circuit will be resistive only and the current through and hence the flux produced by the shunt interpole winding 65 will be in phase with the voltage across the capacitor 56 and therefore lagging the quadrature flux by 90°. It is to be understood that the shunt interpole winding 65 must be distributed in the stator as described above and as shown in Fig. 2 so that the interpole flux does not traverse the armature, but only traverses a sufficient section to effect cancellation of the transformer voltage.

Variable resistor 67 is provided in the interpole circuit to keep the shunt interpole current at the correct value and permits adjustment of the current to obtain black commutation on the direct axis brushes without sparking due to transformer voltage. The connection of the interpole circuit across the quadrature capacitor 56 disturbs the quadrature circuit very little since the interpole current is only about ⅙ the value of the quadrature current. Minor power factor and current adjustments can be effected by varying the values of interpole capacitor 66 and variable resistor 67 to produce black commutation over the entire range of quadrature current. It can now be seen that the arrangement described above provides an interpole flux directly proportional to and 90° out of phase with the quadrature flux, the condition necessary to effect cancellation of the transformer voltage in a motor where the line voltage is substantially constant.

Figure 5:
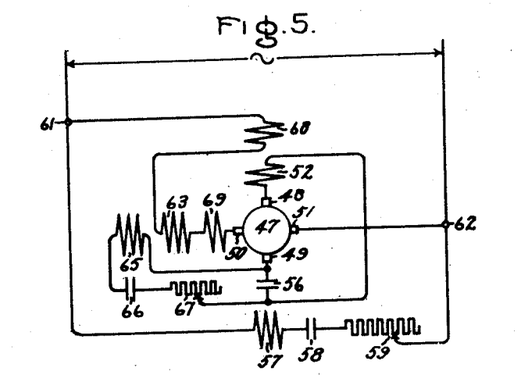
Fig. 5 illustrates the interpole winding in a series start alternating current amplidyne motor.

Referring now to Fig. 5, there is shown an alternating current amplidyne motor arranged with series starting and amplidyne run characteristics and incorporating the reversed flux interpole of this invention. Here, armature 47 is provided with quadrature brushes 48 and 49 and direct axis brushes 50 and 51. The quadrature circuit includes quadrature field 52 and quadrature tuning capacitor 56 and the direct axis circuit includes series starting field 68, compensating winding 63, and the conventional load interpole winding 64. The control field 57 is tuned by capacitor 58 and variable resistor 59 serves to vary the control field excitation which in turn varies the speed of the motor. The direct axis and control field circuits are both connected across the alternating current power source lines 61 and 62.

The operation of this motor, as thus far described, is substantially as described above in the discussion of Fig. 4, however, the series starting field 68 provides an initial component of quadrature excitation starting at rest which co-acts with the current flowing in the direct axis from the lines 61 and 62 to produce the initial motor starting torque. Thus the motor starts as a conventional series motor, but immediately on rotation, the excitation provided by the control field becomes effective and the motor runs as an amplidyne machine. The reversed flux interpole circuit including shunt interpole winding 65, capacitor 66 and variable resistor 67 is connected across the quadrature capacitor 56 as described under the discussion of Fig. 4.

The embodiments shown in Figs. 1, 3, 4, and 5 have all been tested using a small fractional horsepower frame size machine. This machine had stator punchings of 8 1/16" outside diameter and 5.05" inside diameter. The rotor was 5.0" diameter leaving a single gap of .025". The stacking of both the rotor and stator was 5½" and the lamination thickness .025". The rotor was provided with 24 slots having 72 coils, 5 turns per coil, of .0571" wire with three coils per slot. The quadrature winding comprised two coils of 20 turns per coil of .0403" wire. The control field had two coils, 500 turns per coil, of .179" wire. These tests were run at 50 cycles using a .45 mf. capacitor in the control field circuit and a 46 mf. capacitor in the quadrature circuit. The compensating field consisted of two coils of .0571" wire having 25 turns around the middle tooth, 20 turns around 3 teeth, 20 turns around 5 teeth, and 25 turns around 7 teeth.

The above windings were distributed in the stator, as shown in Fig. 10 of the aforesaid application Serial No. 785,846. The load interpole consisted of 6 turns on the center tooth and 5 turns on the second tooth from the center, two coils for each pole, arranged in series to produce the reversed interpole flux in the same manner as the transformer voltage interpole of this invention.

The shunt interpole which is the subject of this application, had 4 coils with 2 coils per pole, the center coils 39 and 40 each having 250 turns of .0142" wire and the side coils 41 and 42 each having 206 turns of .0142" wire, all connected in series. The capacitor 47 of Fig. 3 at 50 cycles was 3.75 mf. and the capacitor 66 of Figs. 4 and 5 was 10.75 mf. The transformer 54 of Fig. 4 had a 3 to 1 step down ratio to bring the line voltage to approximately the value required to produce the main field flux.

A machine described above when arranged as a motor in accordance with Fig. 4, operated with black commutation on all brushes at loads up to one horsepower at 3400 R. P. M. on a 200 volt, 50 cycle supply. When arranged, as shown in Fig. 1, a load of 2.5 kw. was taken at 220 volts, 50 cycles, at 3400 R. P. M.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine of the armature reaction excited type having a stationary member and a rotatable member provided with a commutator, a set of primary brushes and a set of secondary brushes electrically displaced from said primary brush set adapted to provide a primary and a secondary circuit respectively through said rotatable member, a circuit including a field exciting winding, capacitive reactance means in one of said circuits for substantially neutralizing the inductive effect thereof, and a second field winding for substantially neutralizing the transformer voltage between said primary circuit and said secondary circuit.

2. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding, capacitive reactance means in one of said circuits for substantially neutralizing the inductive effect thereof, and a second field winding for substantially neutralizing the transformer voltage between said primary circuit and the armature turns short-circuited by said secondary brush set.

3. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitive reactance means in one of said circuits for substantially neutralizing the inductive effect thereof, and a third field winding for substantially neutralizing the transformer voltage between said primary circuit and the armature turns short-circuited by said secondary brush set.

4. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitive reactance means in one of said circuits for substantially neutralizing the inductive effect thereof, and a third field winding for substantially neutralizing the transformer voltage between said primary circuit and the armature turns short-circuited by said secondary brush set, said last named winding producing flux which lags the flux produced by the current in said primary circuit by 90°.

5. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in each of said primary and said field exciting circuits for substantially neutralizing the inductive effect thereof, and a plurality of interpoles for substantially neutralizing the transformer voltage between said primary circuit and the armature turns short-circuited by said secondary brush set, said interpoles being adapted to produce flux which lags the flux produced by the current in said primary circuit by 90°.

6. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in each of said primary and field exciting circuits for substantially neutralizing the inductive effect thereof, and a plurality of interpole sets for substantially neutralizing the transformer voltage between said primary circuit and the armature turns short-circuited by said secondary brush set, said interpoles being adapted to produce a flux which lags the flux produced by the current in said primary circuit by 90°, each of said interpole sets having two poles of opposite polarity arranged so that the flux produced by one of said poles is turned back into the other of said poles without traversing said armature whereby the flux produced by said interpoles does not interfere with the flux produced by said first named field exciting winding.

7. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole pieces arranged in two sets, and interpole windings arranged on two pole pieces of each of said pole piece sets, said interpole windings being adapted to provide a flux which lags the flux produced by the current in said primary circuit by 90°, said interpole windings on each of said pole piece sets being of opposite polarity whereby the flux produced by one of said interpole windings is turned back into the other of said interpole windings without traversing said armature.

8. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a polarity of pole pieces, an interpole winding arranged on one of said pole pieces for substantially neutralizing the transformer voltage between said primary circuit and the armature windings short-circuited by said secondary brush set, and a second interpole winding arranged on another of said pole pieces and of opposite pourality from said first named interpole winding for turning back the flux produced by said first named interpole winding whereby said flux does not traverse said armature.

9. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole pieces, an interpole winding arranged on one of said pole pieces for substantially neutralizing the transformer voltage between said primary circuit and the armature winding short-circuited by said secondary brush set, and another interpole winding arranged on another of said pole pieces and spaced apart from said first named interpole winding being of opposite polarity from said first named interpole winding whereby the flux produced by said first named interpole winding is turned back into said second named interpole winding without traversing said armature.

10. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole pieces, an interpole winding arranged on one of said pole pieces and in a plane with said secondary brush set for substantially neutralizing the transformer voltage between said primary circuit and the armature windings short-circuited by said secondary brush set, and another interpole winding arranged on another of said pole pieces and of opposite polarity from said first named interpole whereby the flux produced by said first named interpole winding is turned back into said second named interpole winding without traversing said armature.

11. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole pieces, an interpole winding arranged on one of said pole pieces and in a plane with said secondary brush set for substantially neutralizing the transformer voltage between said primary circuit and the armature windings short-circuited by said secondary brush set, and a second interpole winding arranged on another of said pole pieces and of opposite polarity from said first named interpole winding whereby substantially all of the flux produced by said first named interpole winding is turned back into said second named interpole winding, the pole piece on which said second named interpole winding is arranged having a larger face area than the face area of the pole piece on which said first named interpole winding is arranged, said second named interpole winding having less turns than said first named interpole winding whereby leakage flux across said armature is substantially cancelled.

12. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member having a plurality of pole piece sets provided with a plurality of winding slots, each of said pole piece sets having an interpole winding arranged in two of said slots for producing a flux which substantially neutralizes the transformer voltage between said primary circuit and the armature windings short-circuited by said secondary brush set, and a second interpole winding arranged in another two of said slots in each of said pole pieces and of opposite polarity from said first named interpole winding whereby the flux produced by said first named interpole winding is turned back into said second named interpole winding without traversing said armature.

13. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of radially inward extending flux conducting teeth, an interpole winding arranged on one of said teeth and producing a flux 90° lagging from the flux produced by the current in said primary armature circuit for substantially neutralizing the transformer voltage between said primary circuit and the armature windings short-circuited by said secondary brush set, a second interpole winding arranged on another of said teeth and having a polarity opposite from said first named interpole winding for turning back the flux produced by said first named interpole winding into said second named interpole winding so that said flux does not traverse said armature.

14. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole piece sets having a plurality of flux conducting teeth with winding slots interspaced therebetween, a set of interpole windings arranged on diametrically opposite teeth of said pole piece sets and in a plane with said secondary brush set, another set of interpole windings arranged on other diametrically opposite teeth of said pole piece sets and spaced apart from said first named interpole winding set by at least one tooth, said interpole windings producing a flux 90° lagging from the flux produced by current in said primary circuit for substantially neutralizing the transformer voltage between said primary circuit and the armature windings short-circuited by said secondary brush set, said second named interpole winding set being of opposite polarity from said first named interpole winding set is turned back into said second named interpole winding set without traversing said armature.

15. A dynamoelectric machine of the armature reaction excited type having a stationary member and a rotatable armature provided with a commutator, a set of primary brushes and a set of secondary brushes electrically displaced from said primary brush set adapted to provide a primary and a secondary circuit respectively through said armature, a circuit including a field exciting winding for controlling the secondary characteristics of said machine, a second field exciting winding for substantially neutralizing the armature reaction produced by current in said secondary circuit, capacitor means in one of said circuits for substantially neutralizing the inductive effect thereof, said stationary member being provided with a plurality of pole piece sets having flux conducting teeth with winding slots therebetween, a pair of interpole windings of opposite polarity arranged on diametrically opposite teeth of said pole piece sets and in a plane with said secondary brush set, another pair of interpole windings of opposite polarity arranged on other diametrically opposite teeth of said pole piece sets and spaced apart from said first named interpole windings by at least one tooth, said interpole windings producing a flux 90° lagging from the flux produced by the current in said primary circuit for substantially neutralizing the transformer voltage between said primary circuit and the armature windings short-circuited by said secondary brush set, each of said last named interpole windings being of opposite polarity from the first named interpole winding on the same pole piece whereby the flux produced by said first named interpole winding is turned back into said second named interpole winding without traversing said armature.

FRANK W. MERRILL.

No references cited.